United States Patent [19]

Magnusson

[11] Patent Number: 5,291,134
[45] Date of Patent: Mar. 1, 1994

[54] ERASE HEAD POSITIONING METHOD

[75] Inventor: Steven L. Magnusson, Redwood City, Calif.

[73] Assignee: Ampex Systems Corporation, Redwood City, Calif.

[21] Appl. No.: 975,914

[22] Filed: Nov. 13, 1992

[51] Int. Cl.$^5$ ............................................. G01R 32/12
[52] U.S. Cl. ..................................... 324/212; 324/212
[58] Field of Search ............... 360/77.16, 77.12, 57, 360/64, 66, 61, 67, 68, 109; 29/593, 603; 324/210, 212

[56] References Cited

U.S. PATENT DOCUMENTS

| | | | |
|---|---|---|---|
| 4,321,636 | 3/1982 | Lavz | 324/210 X |
| 4,400,809 | 8/1983 | Whitinger | 324/210 X |
| 4,902,971 | 2/1990 | Guzik et al. | 324/212 |
| 4,904,938 | 2/1990 | O'Reilly et al. | 324/212 |
| 5,023,548 | 1/1991 | McMorran | 324/212 |
| 5,047,874 | 9/1991 | Yointoubiam | 324/210 X |

Primary Examiner—John Shepperd
Assistant Examiner—Thmn Se
Attorney, Agent, or Firm—John G. Mesaros

[57] ABSTRACT

A method for analyzing the relative spatial alignment of the erase head pole tips relative to the record head pole tips on a recording of a magnetic tape to be partially overwritten by providing, through first and second erase heads, successive momentary erase pulses of a predetermined time duration in a predetermined phase relation on a non-overlapping basis, wherein each erase head thereby erases recorded information while leaving portions of information therebetween on adjacent track pairs, and then reading or playing back the results of the erasure for analysis of the RF envelope of the erasing pattern by a waveform monitor or ferrofluidic techniques. The duration of the erasures and playback is such that the RF envelope includes at least one erasure from the first erase head and at least one erasure from the second erase head.

5 Claims, 3 Drawing Sheets

ERASE HEAD POSITIONING METHOD

FIELD OF THE INVENTION

This invention relates to rotary scan devices for digital tape recording and reproducing apparatus, and more particularly to a method of precisely positioning of erase pole tips with respect to their corresponding record pole tips in a rotary scan device (scanner) for a digital video tape recording and reproducing apparatus.

BACKGROUND OF THE INVENTION

Magnetic tape recording and reproducing apparatus includes rotary scan devices, in which first and second pairs of diametrically opposite record transducers or heads are positioned within the scanner housing for rotation therewith. In addition, usually, at some given angular displacement, another set of pairs of playback or read heads are positioned in diametrically opposite relationship. For erase before record systems, such rotary scan devices for transferring signals to and/or from a magnetic tape medium often include erase pole tips within the scanner in fixed relation to the record pole tips. This fixed relation is also with respect to the tracks recorded on the magnetic tape, that is the erase pole tip must be in alignment with its associated record pole tip relative to a recorded magnetic tape track.

For editing purposes, these erase pole tips are used to eliminate, or erase, the previously recorded signal prior to re-recording a new signal, this action being an erase operation, followed by a record operation on the same or a subsequent scan with the erase head preceding the record head in time due to its physical positioning within the scanner along with the timing of actuation thereof by the control electronics. Following the erase and record, the signal is then played back on the same or a subsequent scan to verify the accuracy of the erased and re-recorded data. In conventional video tape recording and editing apparatus utilizing rotary scanners, often the record and playback pole tips are arranged in pairs with each head of a pair in proximate relation to the other, to minimize the number of pole tip support structures.

The erase heads, on the other hand, may take any configuration suitable to the format and the machine. In some instances, there is a single erase head per track, in other instances, one head may be utilized to erase two adjacent tracks. Such heads are normally arranged in diametrically opposed relation, with each head having a width sufficient to substantially erase one or more given tracks. In some machines using a single head for erasing two adjacent tracks, the width of the erase head may be slightly greater than the width of the two adjacent tracks, with a portion of the erase head slightly intruding into the two tracks on both sides of the two adjacent tracks being erased. The geometry, in large part, is dictated by the concentration of the flux erasure signal strength, with the signal strength diminishing adjacent the outer edges of the erase head where the head intrudes into the outlying tracks. However, should the erase head be misaligned relative to the two adjacent tracks, excessive erasing may occur on the adjacent tracks. Furthermore, if the erase head is misaligned relative to the associated record head, while it may be possible to position the erase head properly over the previously recorded information by using the control track longitudinal tracking control, the recording would intrude into an adjacent track. Thus it is imperative that the erase head be properly aligned relative to the tracks, and relative to the record head associate therewith.

In addition, track density, that is, the number of tracks per inch of tape, plays a significant part in the accuracy and completeness of the erase process. If the track density is not too high (e.g., early video recording formats were 139 tracks/inch), the manufacturing tolerances which accumulate between the record pole tip locations and the erase pole tip locations within the scanner are small enough (relative to the track size) to be ignored. However, as track densities have increased as with the recent digital formats which are in the range of 650 tracks/inch, the manufacturing tolerances have become a significant portion of the track size and cannot be ignored. Some provision must be made for adjustment of the erase pole tip elevations to ensure they correctly erase the desired track without excessively damaging the adjacent tracks.

It is the object of this invention to provide a simple technique for verifying and/or adjusting the erase pole tip locations relative to the record pole tip locations in a rotary scan device. Furthermore it is the object of this invention to allow this adjustment to be done in the field without the need for ferrofluid development and precision measurement of a tape sample using a microscope.

SUMMARY OF THE INVENTION

The foregoing and other objects of the invention are accomplished by providing a method for analyzing the relative spatial alignment of the erase head pole tips relative to the record head pole tips on a recording of a magnetic tape to be partially overwritten by providing, through first and second erase heads, successive momentary erase pulses of a predetermined time duration in a predetermined phase relation on a non-overlapping basis, wherein each erase head thereby erases recorded information while leaving portions of information therebetween on adjacent track pairs, and then reading or playing back the results of the erasure for analysis of the RF envelope of the erasing pattern by a waveform monitor or ferrofluidic techniques. The duration of the erasures and playback is such that the RF envelope includes at least one erasure from the first erase head and at least one erasure from the second erase head.

Other objects, features and advantages of the invention will become apparent from a reading of the specification when taken in conjunction with the drawings, in which like reference numerals refer to like elements in the several views.

DESCRIPTION OF THE PREFERRED EMBODIMENT

Figure 1:
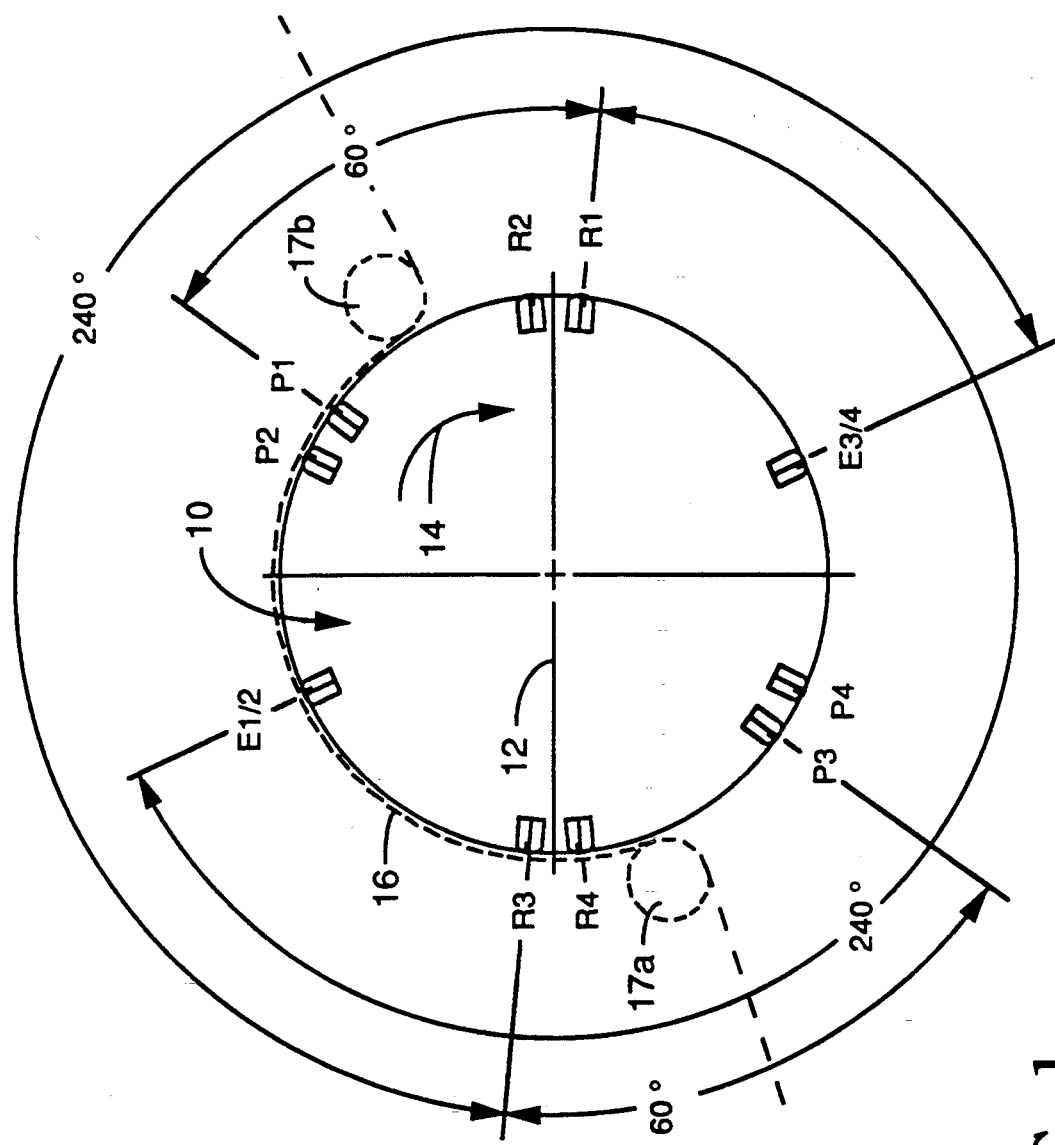
FIG. 1 is a schematic plan view showing the transducer arrangement of a rotary scan assembly for utilization with the invention.

Referring now to the drawings, and particularly to FIG. 1, there is shown a schematic pan view of a rotary scanner assembly, generally designated 10, including a first pair of record heads R1, R2, with a diametrically opposed pair of record heads R3, R4. Due to the physical size, that is, width, of the record heads, there is a slight angular displacement between heads of the same pair, this being depicted by the positioning of the adjacent record heads of each pair equiangularly on opposite sides of a diameter, designated 12. Correspondingly, there are first and second pairs of playback heads, the first pair P1, P2 being diametrically opposite the second pair P3, P4. The angular spacing between playback heads of a given pair is identical to the angular spacing between the record heads of a pair. The angular positioning of the associated pair of heads is sixty degrees, that is, as shown in the drawings, the angle between playback head P3 and record head R3 is sixty degrees (the same applies to the angle between P1 and R1), For editing purposes, the scanner assembly 10 is provided with two diametrically opposed erase heads, the first being designated E1/2, and the opposite one being designated E3/4. Each of the erase heads, such as E1/2 is a single transducer having a width sufficient to erase two adjacent tracks, in the case of E1/2, to erase tracks 1 and 2 simultaneously (See also FIG. 3). Erase head E3/4 has a width sufficient to erase tracks 3 and 4, simultaneously. Both erase heads are of the same width and this width is slightly greater than the width of two adjacent recorded tracks. The diameter between the erase heads E1/2 and E3/4 is angularly displaced 240 degrees clockwise relative to a diameter between record heads R1 and R3, that is with rotation of the scanner assembly 10 in the direction of the clockwise arrow 14, erase head E1/2 leads record head R1 by 240 degrees.

The broken line path 16 partially encircling the scanner assembly 10 shows the path of a magnetic tape about the scanner periphery and about two guides or rollers 17a and 17b, with the "degree of wrap" about the scanner for the present embodiment being about 188 degrees, that is, the magnetic tape is in contact with 188 degrees of the perimeter of the drum of the scanner assembly 10, with 172 degrees of the wrap being used to record each track. This 172 degree angle is referred to as the "active wrap" angle while the 188 degree angle is referred to as the "physical wrap" angle.

Figure 2:
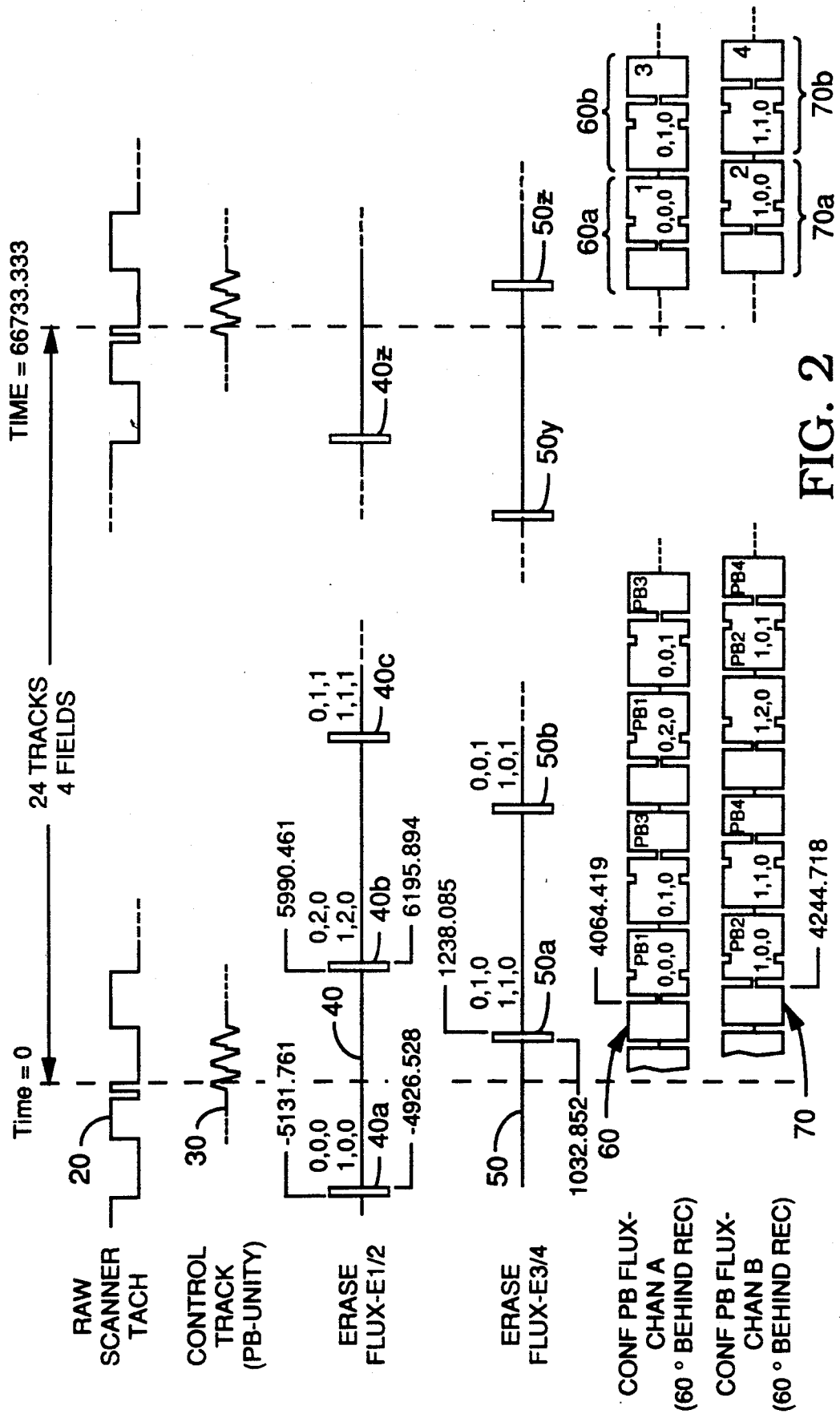
FIG. 2 is a time aligned graphical depiction of the correlation between control signal pulses, erase flux pulses and the resultant erasing pattern.

Referring now to FIG. 2, there is shown a graphical depiction of the time and spatial relation between erase pulses relative to the control track information, with the resultant erasing patterns which graphically (using a waveform analyzer, or any other similar device or method) illustrate the positional relationship or variance, relative to a recorded track, between the erase head and the record head of the scanner assembly 10.

Briefly, the invention consists of using a special erasing pattern inserted into a base recording, that is, a magnetic tape previously recorded on the same machine. From the effect of these erasing signals on the playback signals of the original recording, the existing erase head positions and the necessary (if any) corrective actions can be deduced-by using only an oscilloscope or waveform monitor. FIG. 2 describes one such pattern for a particular 525 line video format (different formats and/or scanner configurations might use a different pattern) with a first vertical line designated Time=0 and a second vertical line designated Time=66733.333 microseconds, this being the time for rotation of the scanner assembly 10 at a given revolutions per second for a given diameter to cover 24 tracks or four fields of video information on magnetic tape. By way of example, for a 525 line video format, and with a scanner diameter of 96.494 mm, with a scanner rotational speed of 89.91 (90/1.001) revolutions per second, the head to tape speed is about 27,387 mm/second.

In FIG. 2, graph line 20 shows the raw scanner tachometer pulse train; graph line 30 shows the control track waveform; graph line 40 shows the erase flux pattern or pulse bursts for erase head E1/2; graph line 50 shows the erase flux pattern or pulse bursts for erase head E3/4; with RF envelope waveforms 60 (designated Channel A) and 70 (designated Channel B) being positioned spatially with respect to the time lines of the graph lines thereabove. The RF envelopes on the graph are designated confidence playback flux-channel A (envelope 60) and confidence playback flux-channel B (envelope 70). The graphs and patterns shown are for a sixty degree angular displacement between the playback and record heads, that is the playback head is sixty degrees behind the record head to provide a read, verify write arrangement.

As a reference, adjacent each erase pulse 40a, 40b, 40c, etc., on graph line 40, there is an upper line of numerals and another line immediately therebelow. For example, adjacent erase burst or pulse 40a, there is a line showing 0,0,0, and immediately therebelow is a line showing 1,0,0. The same applies to graph line 50, in which erase burst or pulse 50a has adjacent thereto, on the upper line 0,1,0, and on the lower line 1,1,0. Graph line 40 is designated Erase Flux E1/2, and the upper line 0,0,0 is related to information recorded on a track 1 segment (which will be erased), with the lower line information of 1,0,0 being that information recorded on a track 2 segment (which will likewise be erased), both segments of which are time related to the occurrence of the erase burst or pulse 40a. Similarly, track segments 3 and 4, with the associated information of 0,1,0 and 1,1,0 represent the information occurring in the track segments concurrent with the erase burst or pulse for erase head 3/4.

As an additional reference, time data is placed before and after each erase burst or pulse 40a–40c, 40z, 50a, 50b, 50y and 50z, the time difference therebetween being 205.233 microseconds, which is the duration of each of the erase bursts or pulses. It is important to note the spacing of the erase bursts or pulses as shown in FIG. 2. The erase heads E1/2 and E3/4 are physically 180 degrees apart, and the erase pulses 40a and 40b have a constant period which is identical to the period between erase pulses 50a and 50b. However, for the purpose of obtaining the erasing patterns 60 and 70, there is a time offset between commencement of the erase pulse 40a from erase head E1/2 relative to the commencement of the erase pulse 50a from erase head E3/4. Based on the times given on the graph, by way of example, the cycle or period between start of erase pulses 40a and 40b is 11,122.222 microseconds, while the time from the commencement of erase pulse 40a (from erase head E1/2) to the time of commencement of erase pulse 50a (from erase head E3/4) is 6,164.613 microseconds, which is about 55% of the cycle or period. This particular delay, in part, aids in providing the results shown in the configuration of the RF envelopes 60 and 70.

Figure 4:
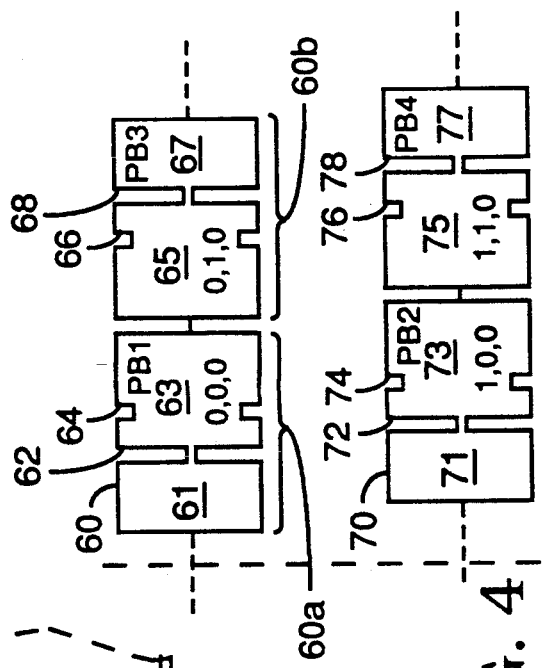
FIG. 4 is an enlarged view of the playback envelope of the erasing patterns.
Figure 3:
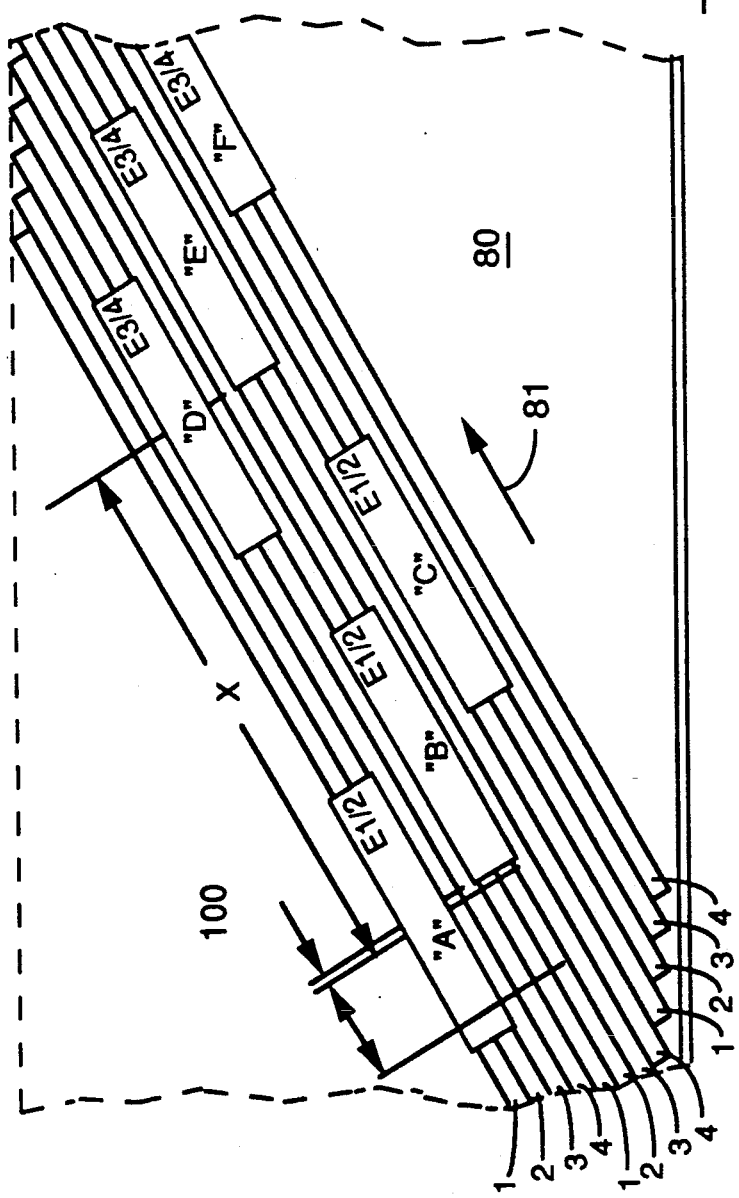
FIG. 3 is a plan view of a section of magnetic tape, diagrammatically illustrating thereon, the tracks thereof, and the erasing pattern physical positioning relative to the tracks.

Referring also to FIGS. 3 and 4, FIG. 3 depicts a section of magnetic tape 80 having a plurality of helically scanned and recorded tracks thereon with the direction of head scan being depicted by the arrow 81. The tracks are designated by track number corresponding to record and playback head numbers, that is tracks 1 through 4. As can be seen in FIG. 3, the erase pulse duration for each pulse relative to the distance traversed on the tape during the time of the pulse is identical. Each rectangle designated E1/2 is an erase burst or pulse from the E1/2 erase head and correspondingly the rectangles designated E3/4 arise from erase head E3/4. It should also be noted that ideally, the width of the rectangle, which represents the width of the respective tape head, is slightly wider than the width of the two adjacent tracks, as a consequence of which the lower and upper edges of the erase head will intrude slightly into the adjacent track. If the intrusions into the adjacent upper and lower tracks are identical, then the erase head is centered with respect to its two associated tracks. This centering is likewise important to the shape of the resultant erasing RF envelope 60 or 70, as will become apparent. On the drawing there is a dimension designated "X", which is the distance on tape 80 between the centers of erase pulse rectangles E1/2 and E3/4. For example, this distance is approximately 17 millimeters, while the circumference of the scan drum of the scanner assembly 10 is about 303 millimeters. By dividing the two numbers, this represents an erase pulse duration providing a physical length of about 18% of the scanner circumference. Since each track is written over 172 degrees of rotation, or for a tape length of about 144.8 millimeters (172/360×303 mm), the erase pulse duration provides a physical length of about 12% of the tape contact length. These dimensions are provided as an example to illustrate the momentary nature of application of an erase pulse to provide a playback waveform envelope having recorded information as well as erasure information for the purpose of assisting on determining erase head alignment relative to the record head in an editing system.

As part of the method, the base recording has been made and the tape is then rewound whereupon, playback commences. Referring again to FIG. 2, the scanner tachometer initiates a narrow signal pulse 20a, which is used as a reference in the graph as Time=0, this signal being time correlated to the control track signal 30 which is a longitudinal track 82 (See FIG. 3) on the magnetic tape 80 which is used as a position reference for information being recorded thereon at the same time the base recording is made. At some time prior to Time=0, as depicted on graph line 40, a short erase burst or pulse 40a is recorded on the magnetic tape 80, that is erase head E1/2 is energized to provide an erase flux burst momentarily for a fixed time duration (205.233 microseconds), this burst 40a occurring between −5131.761 and −4926.528 microseconds. At a fixed interval or period later a second E1/2 burst or pulse 40b of the same duration is recorded, with this process then being cyclically repeated for pulses 40c to 40z.

This erasure operation of the E1/2 erase head results in the erasure of those portions of the recording within the rectangles E1/2 as shown in FIG. 3, which are erased portions of tracks 1 and 2 thereon. The physical position and spacing of the rectangles, i.e., E1/2 and E3/4, represent the time based relationship thereof relative to the moving magnetic tape 80. For enabling determination of the relative position of the record and erase heads, into a base recording, that is, a magnetic tape previously recorded on the same machine, short duration erase head E1/2 erase bursts or pulses 40a, 40b, etc., are recorded on every scanner rotation. Erase head E3/4 bursts or pulses 50, 50b, etc. are also recorded but are displaced away from the E1/2 bursts so that no overlapping occurs between the E1/2 and E3/4 erase heads. Intermediate the erase bursts designated by the rectangles E1/2 and E3/4 on the tape 80 (See FIG. 3), there is still recorded information. This produces two "holes" or notches in each track playback within the playback RF envelopes 60 and 70, where the holes or notches represent erased information as will be described.

It is important to note in the graphs of FIG. 2 that the playback RF envelopes are designated "Conf PB Flux Chan A (60 Degrees behind rec)" and "Conf PB Flux Chan B (60 Degrees behind rec)", the designation "Conf PB" referring to "confidence playback", a term understood by those skilled in the art. These represent a Channel A and a Channel B, each of which is effectively the envelope shown on the line thereafter. That is, Channel A is a playback of track 1 followed immediately by a playback of track 3, the "PB1" and "PB3" being shown in the upper right corner of the two portions 60a and 60b of the playback RF envelope 60. Correspondingly RF envelope 70 constitutes a playback of track 2 immediately followed by a playback of track 4, these portions being designated 70a (PB2) and 70b (PB4), respectively. By reference to FIG. 3, the erase head E1/2 erase pulse rectangles have been designated "A", "B" and "C", while the erase head E3/4 erase pulse rectangles have been designated "D", "E" and "F". Channel A then results from a playback of track 1 which passes through the "A" rectangle of E1/2, followed by a playback of track 3 of the spatially displaced "D" rectangle of E3/4 (Similarly, thereafter Channel A is a playback of track 1 of the "B" E1/2 rectangle followed by track 3 of the "E" E3/4 rectangle. etc.).

The first hole or notch 62 in the PB1 RF envelope portion 60a and notch 72 in the PB2 RF envelope portion 70a shows the direct erasure of tracks 1 and 2 by erase head E1/2; the second, smaller hole or notch 64 in the PB1 RF envelope portion 60a and the notch 74 in the PB2 RF envelope portion 70a shows the overlap of the erasure of the E3/4 erase head onto tracks 1 and 2, and, if erase head E3/4 is properly adjusted, the % drop for the second smaller hole or notch 64, 74 in each RF envelope portion 60a, 70a, respectively, would be equal. If the second notches 64, 74, do not show the same % drop then the erase head E3/4 pole tip elevation needs adjustment and the amount of adjustment can be calculated from the difference in the % drops.

The first smaller hole or notch 66 and 76 in the PB3 and PB4 RF envelope portions 60b and 70b shows the overlap of the erasure of erase head E1/2 onto tracks 3 and 4, and, if E1/2 is properly adjusted, the % drop for the first smaller hole in each RF envelope would be equal. If the first holes do not show the same % drop then the E1/2 pole tip elevation needs adjustment (the amount of adjustment can be calculated from the difference in the % drops). The second larger hole or notch 68 and 78 in the PB3 and PB4 RF envelope portions 60b and 70b shows the direct erasure of tracks 3 and 4 by erase head E3/4.

Viewing FIGS. 3 and 4, the reason for the configuration of the RF envelope is as follows. Using from FIG.

3, as a reference point E1/2 rectangle "B" and E3/4 rectangles "D" and "E", and with the playback scan of tape 80 having the playback head reading track 1 in the direction of arrow 81 (from left to right as viewed in the figure), just prior to the playback head reaching rectangle "B", in the space between the double-ended arrow 100, there is recorded information on track 1, which, on playback corresponds to the first block portion 61 of the RF envelope 60 in FIG. 4. Thereafter, the playback head, still reading track 1, reaches the E1/2 rectangle "B", in which there has been an erasure, this portion corresponding to the larger notch 62 of the envelope 60, in which there has been substantially complete erasure. Next, the playback head, while continuing to read track 1, reads more of the pre-recorded information in the gap between rectangles "B" and "D", this corresponding to the first portion of block 63 just prior to notch 64. Thereafter, the playback head reaches the E3/4 erase rectangle "D", and reads that portion in which the lower edge intrudes into track 1, this resulting in the short notch 64, the depth of which signifies the intrusion of the erase head E3/4 into track 1. At this point, while reading the "intrusion", it is noted that there is still a significant amount of recorded information signal on track 1 for the length of the "D" rectangle. While continuing to read track 1 thereafter, there is full strength signal as indicated by the portion of block 63 to the right of the notch 64. After portion 60a, there is a short line, this being the time between playing tracks 1 and 3. Since the track is 172 degrees long and the playback heads are 180 degrees apart, there is no signal for 8 degrees of scanner rotation. That is, after playback head PB1 finishes reading track 1, then there is 8 degrees of scanner rotation before playback head PB3 starts reading track 3.

On continuance of the playback of channel A, track 3 is then read, wherein the first portion of block 65 prior to notch 66 represents the reading of the recorded information prior to the beginning of the E1/2 rectangle "B", the timing of reading track 3 being initiated prior to this physical position. The playback head then reads that portion of track 3 where the erasure of E1/2 rectangle "B" intrudes into track 3, this portion being represented by the shorter notch 66, with the playback head then reading the recorded information of track 3 in the space between the trailing edge of rectangle "B" and the beginning of E3/4 erase rectangle "E". This is then followed by reading of the erasure of rectangle "E", resulting in the larger notch 68, after which the read operation reads additional recorded information for the balance of the duration of the read or playback cycle.

For channel B, the operation is the same, with the block 71 of RF envelope 70 being representative of the reading of track 2 prior to rectangle "B" (as a reference point), with the notch 72 being the substantially complete erasure within the erase rectangle "B". This is followed by the continued reading of the recorded information on track 2 between erase rectangles "B" and "E" (the beginning of portion 73), followed by the reading of the signal strength reduced reading of the information in the region where erase rectangle "E" intrudes into track 2, causing short notch 74, after which full signal strength information is read, as represented by the balance of portion 73 of RF envelope 70.

On continuance of the playback of channel B, track 4 is then read (portion 70b), wherein the first portion of block 75 prior to notch 76 represents the reading of the recorded information prior to the beginning of the E1/2 rectangle "C", the timing of reading track 4 being initiated prior to this physical position. The playback head then reads that portion of rectangle "C" where the erasure of E1/2 intrudes into track 4, this portion being represented by the shorter notch 76, with the playback head then reading the recorded information in the space between the trailing edge of rectangle "B" and the beginning of E3/4 erase rectangle "E". This is then followed by reading of the erasure of rectangle "E", resulting in the larger notch 78, after which, in that portion of block 77, the read operation reads additional recorded information for the balance of the duration of the read or playback cycle.

The information to be derived from the RF envelope 60 is the erase head performance as well as the percentage of drop (i.e., the depth of the short notches 64, 66, 74 and 76) which indicates the E1/2 and E3/4 erase head elevation alignment. The erase head performance is indicated by the width of the neck between the upper and lower portions of the longer notch, such as notch 62, which is the distance on tape in which there is a complete or substantially complete erasure. This, as described, corresponds to the E1/2 erase rectangle "A" (or "B" or "C"). The narrower this neck portion, the more complete the erasure, and, conversely, the wider the neck portion, the less complete the erasure. The neck portion of RF envelope 60 associated with notch 62, as well as the neck portion of RF envelope 70 associated with notch 72 shows the performance of erase head E1/2; the neck portion of RF envelope 60 associated with notch 68, as well as the neck portion of RF envelope 70 associated with notch 78 shows the performance of erase head E3/4.

For erase head alignment purposes, the depth and symmetry of the upper and lower notch portions of the shorter notch 64 (or 66, 74 and 78) provides the necessary information. The RF envelopes 60 and 70 depicted in FIGS. 2 and 4 show the ideal case, that being where both erase heads are properly aligned with the short notches 64, 66, 74 and 76, all being the same depth and symmetrical with respect to the horizontal (as viewed in the drawings) center line. However, as would be obvious, in the event of an erase head misalignment relative to the record head, the reading of the lower or upper edge of an adjacent track could result in no short notch on one side of the envelope with a longer short notch on the opposite side of the envelope, depending on the vertical direction of the misalignment relative to the track being read. For erase head E1/2, the percentage drop in notches 62 and 72 indicates the erase head elevation alignment, while for erase head E3/4, the percentage drop of short notches 68, 78 would indicate the erase head elevation alignment.

In accordance with the invention, in summary, an erase pattern is inserted into a base recording with short duration erase pulses to provide a segment of track which includes originally recorded information and erasure information (both full and partial), which on playback provide a unique pattern, or RF envelope, representative of erase head alignment relative to the record head, or recorded track, wherein the playback duration is long enough to encompass playback of a length of tape including at least one E1/2 erase burst and at least one E3/4 erase burst. It is to be understood however, that although the embodiment described herein utilizes a single head for erasure of two adjoining tracks, the use of the invention is equally applicable to machines having one erase head per track, whether the head is narrower or greater than the width of the track, and whether the recording results tracks with or without guardbands, the important aspect being that the erase is accomplished by leaving information therebetween with the configuration of the RF envelope on playback providing information on relative position of erase head to record head, as well as a measure of erase head efficiency. Of course, with such other track and head arrangements, the playback RF envelope pattern would be unique to the arrangement and need not necessarily look like that depicted herein. While there has been shown and described a preferred embodiment, it is to be understood that various other adaptations and modifications may be made within the spirit and scope of the invention.

What is claimed is:

1. In a video tape recording and reproducing apparatus utilizing a rotary scanner having record head assemblies, playback head assemblies, and at least first and second generally opposed erase heads, a method for determining the alignment of the erase heads relative to the record head, said method comprising:

inserting into said apparatus a magnetic tape prerecorded on said apparatus and having a plurality of adjacent tracks recorded thereon;

scanning said tape;

energizing said at least first and second erase heads momentarily, successively and periodically for erasing portions of information from said tracks while leaving portions of recorded information therebetween;

playing back a channel of the thus erased tracks, said channel including one track followed by the next non-adjacent track; and analyzing the playback waveform envelope to determine the relative alignment of the record heads to the erase heads based on the shape of the resulting envelope.

2. The method according to claim 1 wherein the erase heads of said apparatus have a dimension resulting in an overlap of an adjacent track, and said step of analyzing the playback waveform includes analysis of a drop in the envelope at the point of overlap.

3. The apparatus according to claim 1 wherein the erase heads of said apparatus have a dimension sufficient to erase two adjacent tracks, and the step of analyzing includes examining said waveform envelope to determine the relative symmetry thereof.

4. In a video tape recording and reproducing apparatus utilizing a rotary scanner having first and second pairs of record heads, first and second pairs of playback heads, and first and second generally opposed erase heads, each capable of erasing two adjacent tracks of a magnetic tape and having a dimension in a direction perpendicular to the path of said tracks to provide a slight overlap onto the tracks adjacent the two adjacent tracks, a method for determining the alignment of the erase heads relative to the record head, said method comprising:

inserting into said apparatus a pre-recorded magnetic tape having a plurality of adjacent tracks recorded thereon in pairs;

scanning said tape;

energizing said first erase head momentarily and periodically for erasing portions of information from adjacent ones of said tracks;

thereafter energizing said second erase head momentarily and periodically for erasing portions of information from the next two successive ones of said tracks with said erase heads being energized on a given scan on a non-overlapping basis while leaving recorded information on said tape between successive energizations of said first and second erase heads;

playing back a channel of the thus erased tracks, said channel including first one track followed by the next non-adjacent track; and analyzing the playback waveform envelope to determine the percentage drop in the waveform caused by the overlap of the erase heads into adjacent tracks outside the channel.

5. In a video tape recording and reproducing apparatus utilizing a rotary scanner having first and second pairs of record heads, first and second pairs of playback heads, and first and second generally opposed erase heads, each capable of erasing two adjacent tracks of a magnetic tape and having a dimension in a direction perpendicular to the path of said tracks to provide a slight overlap onto the tracks adjacent the two adjacent tracks, a method for determining the alignment of the erase heads relative to the record head, said method comprising:

inserting into said apparatus a pre-recorded magnetic tape having a plurality of adjacent tracks recorded thereon in pairs;

scanning said tape;

energizing said first and second erase heads momentarily, successively and periodically for erasing portions of information from adjacent ones of said tracks while leaving portions of recorded information therebetween;

playing back a channel of the thus erased tracks, said channel including first one track followed by the next non-adjacent track; and analyzing the playback waveform envelope to determine the percentage drop in the waveform caused by the overlap of the erase heads into adjacent tracks outside the channel, which drop is indicative of erase head alignment.

* * * * *